United States Patent
Murata et al.

(10) Patent No.: US 6,488,888 B2
(45) Date of Patent: Dec. 3, 2002

(54) LEAD-FREE SOLDER ALLOYS

(75) Inventors: Toshikazu Murata, Kadoma (JP); Hiroji Noguchi, Kadoma (JP); Sadao Kishida, Kadoma (JP); Toshihiko Taguchi, Tokyo (JP); Shozo Asano, Tokyo (JP); Ryo Oishi, Tokyo (JP); Takashi Hori, Tokyo (JP)

(73) Assignees: Matsushita Electric Industrial Co., Ltd., Osaka (JP); Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 09/828,164

(22) Filed: Apr. 9, 2001

(65) Prior Publication Data

US 2002/0015660 A1 Feb. 7, 2002

Related U.S. Application Data

(63) Continuation of application No. 09/050,078, filed on Mar. 30, 1998, now Pat. No. 6,241,942.

(30) Foreign Application Priority Data

Sep. 29, 1995 (JP) .............................................. 7-275029
Sep. 29, 1995 (JP) .............................................. 7-275030
Mar. 22, 1996 (JP) .............................................. 8-91814

(51) Int. Cl.[7] .............................................. C22C 13/02
(52) U.S. Cl. ....................................... 420/561; 420/562
(58) Field of Search ................................ 420/560, 561, 420/562

(56) References Cited

U.S. PATENT DOCUMENTS 4,670,217 A    6/1987  Henson et al.
4,695,428 A    9/1987  Ballentine et al.
5,500,183 A  * 3/1996  Noordegrauf et al. ...... 420/557
5,718,868 A  * 2/1998  Ninomiya et al. .......... 420/560

FOREIGN PATENT DOCUMENTS

| EP | 0 499 452    |   | 8/1992  |
|----|--------------|---|---------|
| EP | 0 612 578 A1 | * | 8/1994  |
| JP | 48-39693     | * | 11/1973 |
| JP | 6-15476      |   | 1/1994  |
| JP | 6-238479     |   | 8/1994  |
| JP | 6-344180     |   | 12/1994 |
| JP | 7-1178       |   | 1/1995  |
| JP | 7-40079      |   | 2/1995  |
| JP | 7-51883      |   | 2/1995  |
| JP | 8-132279     | * | 5/1995  |
| JP | 7-155984     |   | 6/1995  |
| JP | 8-118067     | * | 5/1996  |
| JP | 8-132279     |   | 5/1996  |

OTHER PUBLICATIONS

Welding Journal Including Research, vol. 71, No. 10, (Oct. 1992), Bob Irving "Host of New Lead–Free Solders Introduced" pp. 47–49.

* cited by examiner

Primary Examiner—John Sheehan
(74) Attorney, Agent, or Firm—Sughrue Mion, PLLC

(57) ABSTRACT

A lead-free solder alloy having a relatively low melting temperature and suitable for use to solder electronic devices consists essentially of: from 7 to 10 wt % of Zn; at least one of from 0.01 to 1 wt % of Ni, from 0.1 to 3.5 wt % of Ag, and from 0.1 to 3 wt % of Cu; optionally at least one of from 0.2 to 6 wt % of Bi, from 0.5 to 3 wt % of In, and from 0.001 to 1 wt % of P; and a balance of Sn. Another such lead-free solder alloy consists essentially of: from 2 to 10 wt % of Zn; from 10 to 30 wt % of Bi; from 0.05 to 2 wt % of Ag; optionally from 0.001 to 1 wt % of P, and a balance of Sn. These solder alloys have a tensile strength of at least 5 kgf/mm$^2$ and at least 10% elongation.

7 Claims, No Drawings

LEAD-FREE SOLDER ALLOYS

This is continuation of application Ser. No. 09/050,078 Mar. 30, 1998, the disclosure of which is incorporated herein by reference now U.S. Pat. No. 6,241,942.

TECHNICAL FIELD

The present invention relates to solder alloys which are completely free from lead and yet suitable for use in soldering of electronic devices without producing thermal damage.

BACKGROUND ART

Sn-Pb alloys have been used in soldering since ancient times, and they are still most popular for soldering electronic devices to printed circuit boards or other substrates.

When they are to be discarded, electronic appliances including televisions, radios, audio or video recorders, computers, copying or printing machines, etc. may be disposed of in landfills, since they are composed of various materials such as synthetic resins used for housings and printed circuit boards, and metals used for wires and other electric connections, and frames, and are not suitable for disposal by incineration.

In recent years, the phenomenon of acid rain has become serious since the acidity of rain is increasing mainly due to discharge of sulfur oxide into the atmosphere by extensive use of fossil fuels such as gasolines and fuel (heavy) oils. Acid rain causes the solders used in discarded electronic appliances present in landfills to dissolve and penetrate into the ground. If such contaminated groundwater is ingested by a person for many years, the accumulation of lead in the person's body may result in lead poisoning (plumbism). From this viewpoint, there is a need of a lead-free solder alloy in the electronics industry.

Conventional lead-free solder alloys are Sn-based alloys such as Sn-Ag and Sn-Sb alloys. In Sn-Ag alloys, an Sn-3.5Ag alloy is the eutectic composition with a melting temperature of 221° C. Even if this composition having the lowest melting temperature among Sn-Ag alloys is used as a solder alloy, the soldering temperature will be as high as from 260° C. to 280° C., which may cause thermal damage to heat-sensitive electronic devices during soldering, thereby deteriorating their functions or rupturing the devices. Of Sn-Sb alloys, an Sn-5Sb alloy has the lowest melting temperature, but its melting temperature is as high as 235° C. in the solidus line and 240° C. in the liquidus line. Therefore, the soldering temperature is in the range of from 280° C. to 300° C., which is still higher than that of the Sn-3.5Ag alloy, and thermal damage to heat-sensitive electronic devices cannot be avoided.

In view of the relatively high melting temperatures of Sn-Ag and Sn-Sb alloys as solder alloys, many attempts to lower their melting temperatures have been proposed. See, for example, Japanese Patent Applications Laid-Open (JP A1) Nos. 6-15476(1994), 6-344180(1994), 7-1178(1995), 7-40079(1995), and 7-51883(1995).

The solder alloys disclosed in these Japanese patent applications contain Bi and/or In (indium) in a large proportion in order to lower the melting temperatures. Although Bi and In are both effective for decreasing the melting temperatures of Sn-Ag and Sn-Sb solder alloys, the addition of Bi and/or In in a large amount is accompanied by the following problems. Addition of Bi in a large proportion makes the solder alloys very hard and brittle. As a result, it is impossible or difficult to subject the solder alloys to plastic working into wire, or when they are used to solder electronic devices, the soldered joints may be readily detached when subjected to only a slight impact. Addition of indium in a large proportion to solder alloys is undesirable due to its very high cost.

In order to avoid thermal damage to electronic devices during soldering, the soldering temperature should be 250° C. or lower, and in order to perform soldering at such a temperature, it is desirable that the liquidus temperature of the solder alloy be 210° C. or lower and preferably 200° C. or lower.

However, with the above-described approaches to lower the melting temperatures of Sn-Ag and Sn-Sb solder alloys by addition of Bi and/or In, it is difficult to decrease the liquidus temperature of the alloys to 200° C. or lower unless Bi and/or In is added in a large amount. Furthermore, even though it is possible to provide a solder alloy having a liquidus temperature lowered to 200° C. or lower by such a means, the solidus temperature thereof, at which solidification of the alloy is completed, may also be lowered even more, so that it takes a prolonged period of time to completely solidify the solder alloy in soldered joints formed by soldering. As a result, if the soldered joints is subjected to any vibration or impact before they are completely solidified, they may be cracked.

Another problem of conventional lead-free solder alloys is that those lead-free alloys having liquidus temperatures which are low enough to be close to their solidus temperatures do not have satisfactory mechanical properties such as tensile strength and elongation, thereby forming soldered joints which have poor bonding strength or which are liable to be detached upon impact.

It is an object of the present invention to provide lead-free solder alloys having a liquidus temperature which is below 210° C. and preferably below 200° C. and a solidus temperature or peak temperature, at which solidification of the alloy is completed or substantially completed, is relatively close to the liquidus temperature.

It is another object of the present invention to provide lead-free solder alloys which have good bonding strength when used for soldering.

A more specific object of the present invention is to provide a lead-free solder alloy having the following properties.

1) It can be used at a soldering temperature below 250° C. and preferably from 230° C. to 240° C. so as to prevent thermal damage to heat-sensitive electronic devices during soldering.
2) It has quite good solderability.
3) It has a narrow (solidification) temperature range between the liquidus and solidus temperatures (or peak temperate at which solidification is substantially completed) such that the alloy is rapidly solidified after soldering in order to prevent the resulting soldered joints from being cracked when vibration or an impact is applied immediately after soldering, the temperature range being close to the eutectic temperature of Sn-Pb alloy.
4) It produces soldered joints having a bonding strength which is high enough to prevent the joints from being detached upon application of an impact.
5) It can be easily subjected to plastic working into wire such that it can be used for soldering with a solder iron.

DISCLOSURE OF THE INVENTION

An Sn-based alloy having a eutectic temperature close to that of an Sn-Pb eutectic alloy (183° C.) is an Sn-9Zn alloy (eutectic temperature: 199° C.). However, the mechanical strength, particularly the tensile strength of the Sn-9Zn alloy is not so high that it cannot form soldered joints having good bonding strength. We have found that addition of Ni, Ag, and/or Cu is quite effective in order to improve the tensile strength and hence bonding strength of Sn-Zn alloys to such a degree that they can be adequately used to solder electronic devices.

The melting temperatures of the resulting alloys having improved tensile strength may be increased to such a degree that electronic devices may be thermally damaged during soldering, particularly when Ag is added. In such cases, addition of Bi in a relatively large amount along with Ag results in improvement in the tensile strength of Sn-Zn alloys without a significant increase in the melting temperatures.

The present invention provides a lead-free solder alloy consisting essentially of:

(1) A lead-free solder alloy consisting essentially of:
from 7 to 10 wt % of Zn,
at least one of from 0.01 to 1 wt % of Ni, from 0.1 to 3.5 wt % of Ag, and from 0.1 to 3 wt % of Cu,
from 0 to 6 wt % of Bi,
from 0 to 3 wt % of In,
from 0 to 1 wt % of P, and
a balance of Sn.

(2) The lead-free solder alloy of (1) which contains at least one of from 0.2 to 6 wt % of Bi and from 0.5 to 3 wt % of In.

(3) A lead-free solder alloy of (1) which consists essentially of:
from 7 to 10 wt % of Zn,
at least one of from 0.1 to 3.5 wt % of Ag, and from 0.1 to 3 wt % of Cu,
from 0 to 6 wt % of Bi,
from 0 to 3 wt % of In,
from 0 to 1 wt % of P, and
a balance of Sn.

(4) The lead-free solder alloy of (3) which contains at least one of from 0.2 to 6 wt % of Bi and from 0.5 to 3 wt % of In.

(5) The lead-free solder alloy of (1) which has a tensile strength of at least 5 kgf/mm² and at least 10% elongation.

(6) The lead-free solder alloy of (1) which has a liquidus temperature of 210° C. or lower and a solidus temperature of 180° C. or higher.

(7) A lead-free solder alloy consisting essentially of:
from 2 to 10 wt % of Zn,
from 10 to 30 wt % of Bi,
from 0.05 to 2 wt % of Ag,
from 0 to 1 wt % of P, and
a balance of Sn.

(8) The lead-free solder alloy of (7) which has a tensile strength of at least 10 kgf/mm² and at least 10% elongation.

(9) The lead-free solder alloy of (7) which has a liquidus temperature of 200° C. or lower and a peak temperature of 170° C. or higher.

(10) The lead-free solder alloy of one of from (1) to (9) which contains from 0.001 to 1 wt % of P.

(11) A lead-free solder alloy consisting essentially of:
from 2 to 10 wt % of Zn,
from 0.01 to 1 wt % of Ni,
from 0.2 to 30 wt % of Bi, and
a balance of Sn,
said solder alloy having a tensile strength of at least 5 kgf/mm² and an elongation of at least 10%.

(12) A lead-free solder alloy consisting essentially of:
from 2 to 10 wt % of Zn,
from 0.1 to 3 wt % of Cu,
from 0.2 to 30 wt % of Bi, and
a balance of Sn,
said solder alloy having a tensile strength of at least 5 kgf/mm² and an elongation of at least 10%.

(13) A lead-free solder alloy consisting essentially of:
from 2 to 10 wt % of Zn,
from 0.01 to 1 wt % of Ni,
from 0.1 to 3 wt % of Cu,
from 0.2 to 30 wt % of Bi, and
a balance of Sn,
said solder alloy having a tensile strength of at least 5 kgf/mm² and an elongation of at least 10%.

(14) The lead-free solder alloy of one of from (11) to (13) which contains from 7 to 10 wt % of Zn.

(15) The lead-free solder alloy of (14) which contains from 0.001 to 1 wt % of P.

BEST MODE FOR CARRYING OUT THE INVENTION

The present invention is now described in detail. In the following description, all percents concerning alloy compositions are by weight.

The lead-free solder alloys according to the present invention are intended as a substitute for conventional Sn-Pb alloys. Therefore, it is desired that the melting temperatures, i.e., liquidus and solidus temperatures of these alloys be close to the eutectic temperature of Sn-Pb alloys (183° C.). The melting temperatures of the lead-free solder alloys are preferably in the range of 183° C.±30° C. The liquidus temperatures are preferably 210° C. or lower and more preferably 200° C. or lower. As long as a solder alloy has a liquidus temperature below 210° C., soldering can be performed at a temperature below 250° C., thereby eliminating or minimizing thermal damage to heat-sensitive electronic devices. The solidus temperatures (or peak temperatures) of the solder alloys are preferably above 150° C., more preferably above 170° C., and most preferably above 180° C. If the solidus temperatures are lowered to less than 150° C., it takes a prolonged time for the alloys to solidify after soldering, and if the soldered joints are subjected to any vibration or impact before they are completely solidified, they will be cracked.

The bonding strength of a soldered joint is correlated to the tensile strength of the solder alloy used, and the level of tensile strength required for solder alloys varies depending on the purposes of soldering. The tensile strength (at break) required for solder alloys used to solder electronic devices is at least 5 kgf/mm². A solder alloy having a tensile strength less than 5 kgf/mm² is not reliable since soldered joints formed therefrom may be detached when subjected to impact.

It is also generally necessary for solder alloys to have a percent elongation which is high enough for the alloys to be deformed into wire by plastic working in order for the alloys to be used in the form of wire when soldering is performed with a soldering iron. In this regard, at least 10% elongation is normally required for solder alloys in order to perform plastic working smoothly.

The solder alloys according to the present invention meet these requirements for mechanical properties, i.e., a tensile strength at break of at least 5 kgf/mm$^2$ and an elongation of at least 10%. Preferably, they have a tensile strength of at least 10 kgf /mm$^2$ and/or an elongation of at least 20%.

While a binary molten alloy is cooled to solidify it, significant heat generation occurs around the liquidus temperature at which the molten alloy begins to solidify and around the solidus temperature at which the solidification is completed. Thus, when the cooling process is monitored by differential thermal analysis, two exothermic variations are observed around the liquidus and solidus temperatures, respectively, on the resulting thermogram.

In a ternary or higher alloy, an additional exothermic variation may be observed at a temperature between the liquidus and solidus temperatures of the alloy, and the exotherm or heat release at that temperature is greater than that at the solidus temperature. In such a case, most of the molten alloy is solidified at that temperature before the temperature goes down to the solidus temperature. When the cooling process of such an alloy is monitored by differential thermal analysis, the resulting thermogram has a third exothermic variation, between the liquidus and solidus temperatures, showing heat release greater than that at the solidus temperature. For this reason, the temperature at which the third exothermic variation occurs is referred to as the peak temperature. In a solder alloy having such a peak temperature between the liquidus and solidus temperatures, the peak temperature can be essentially regarded as a solidus temperature since solidification of the alloy is mostly completed at the peak temperature before the temperature reaches the true solidus temperature. An alloy having a peak temperature above 170° C. can be used successfully as a solder for electronic devices, even though its true solidus temperature is less than 150° C.

These circumstances particularly apply to the lead-free solder alloy in a second embodiment of the present invention containing a large proportion of Bi. In this embodiment, the liquidus temperature of the alloy is significantly lowered by addition of a large proportion of Bi to an Sn-Zn alloy, which may also cause a still more significant decrease in the solidus temperature toward 135° C., that is the Sn-Bi eutectic temperature. However, according to the present invention, such an Sn-Zn-Bi solder alloy can be satisfactorily used as a substitute for Sn-Pb eutectic solder by selecting the composition such that the peak temperature of the alloy is above 170° C., even though the solidus temperature of the alloy is as low as 135° C.

A solder alloy according to a first embodiment consists essentially of Zn: 7%–10%; one or more of Ni: 0.01%–1%, Ag: 0.1%–3.5%, and Cu: 0.1%–3%; optionally at least one of Bi: 0.2%–6%, In: 0.5%–3%, and P: 0.001%–1%; and a balance of Sn. The composition of the solder alloy in the first embodiment was determined for the following reasons. Zn: 7%–10%

In an Sn-Zn alloy containing no or a small proportion of Bi and/or indium (In) according to the first embodiment, if the Zn content is less than 7% or more than 10%, the alloy will not have a liquidus temperature in the range of 183° C.±30° C. and preferably below 210° C. The Zn content is preferably 8%–10% and more preferably 8.5%–9.5%. Ni: 0.01%–1%, Ag: 0.1%–3.5%, Cu: 0.1%–3%

Ni is effective for improving the mechanical properties of an Sn-Zn alloy by refining the crystal grains in the solidification structure of the alloy. This effect is not appreciable if the Ni content is less than 0.01%. Addition of more than 1% Ni abruptly increases the liquidus temperature of the alloy, resulting in an increase in the soldering temperature such that electronic devices may be thermally damaged. The Ni content is preferably from 0.05%–0.5%, more preferably 0.1%–0.3%, and most preferably 0.1%–0.2%.

Similarly, Ag is effective for improving the mechanical strength of an Sn-Zn alloy, and it is also effective for improving the corrosion resistance of the alloy. These effects are not appreciable if Ag is added in an amount of less than 0.1%. Addition of more than 3.5% Ag abruptly increases the liquidus temperature of the alloy, resulting in an increase in the soldering temperature such that electronic devices may be thermally damaged. The Ag content is preferably from 0.1% to 2.0%, more preferably 0.1%–1.0%, and most preferably 0.1%–0.5%.

Likewise, Cu has a significant effect on improvement of the mechanical strength of an Sn-Zn alloy. In the cases where electronic devices are soldered to a printed circuit board having a copper foil conductor formed thereon by dip soldering in a molten solder bath, the presence of Cu in the molten solder alloy bath has the additional effect of suppressing the diffusion of copper in the copper foil conductor into the molten solder bath. These effects are not appreciable if Cu is added in an amount of less than 0.1%. Addition of more than 3% Cu causes precipitation of an Sn-Cu intermetallic compound, thereby abruptly increasing the liquidus temperature of the alloy and deteriorating the solderability thereof. The Cu content is preferably from 0.1% to 2.0%, more preferably 0.1%–1.0%, and most preferably 0.1%–0.5%. Bi: 0.2%–6%, In: 0.5%–3%

Addition of Bi or In to an Sn-Zn alloy which contains one or more of Ag, Cu, and Ni is effective for decreasing the melting temperature of the alloy. Therefore, one or both of Bi and In may optionally be added in relatively small proportions, in addition to one or more of Ni, Ag, and Cu. However, the melting point of the alloy is not appreciably lowered if Bi is added in an amount of less than 0.2% or In is added in an amount of less than 0.5%.

Addition of more than 6% Bi to an Sn-Zn alloy which contains one or more of Ag, Cu, and Ni makes the alloy so hard and brittle that it is difficult to apply plastic working to deform the solder alloy into wire. Furthermore, after soldering is completed, the resulting soldered joints may be readily detached when subjected to impact. When added, Bi is preferably present in an amount of 1%–6% and more preferably 2%–5% in the alloy.

Indium (In) is a very expensive metal, and addition of a large amount of In decreases the melting temperature of the alloy excessively to such a degree that the melting temperature is beyond the desired range of 183° C.±30° C. For these reasons, the proportion of In is limited to up to 3%. When added, In is preferably present in an amount of 1%–3% and more preferably 2%–3% in the alloy. P: 0.001%–1%

Zn is a highly oxidizable metal. Therefore, while a Zn-containing solder alloy is kept in a molten state in dip soldering, Zn is preferentially oxidized to form zinc oxide, which may interfere with soldering, resulting in the formation of defective soldered joints. Addition of P to a Zn-containing solder alloy serves to effectively prevent oxidation of the solder alloy since P forms a thin film on the top surface of the molten solder alloy and hence prevents the solder alloy from directly contacting the surrounding air. Such an oxidation-preventing effect is not appreciable if the P content is less than 0.001%. Addition of more than 1% P deteriorates the solderability of the solder alloy. When added, P is preferably present in an amount of 0.005%–0.5%, more preferably 0.005%–0.1%, and most preferably 0.005%–0.05% in the alloy.

When Ag is added alone (without Ni or Cu) to an Sn-Zn solder alloy in order to improve the mechanical properties thereof, the melting temperature of the alloy may increase excessively. In such cases, Bi can be added in a relatively large amount (from 10% to 30%) to decrease the melting temperature, as in a second embodiment of the present invention.

In the second embodiment, a solder alloy consists essentially of Zn: 2%–10%, Bi: 10%–30%, Ag: 0.05%–2%, optionally P: 0.001%–1%, and a balance of Sn. Due to the addition of Bi in a relatively large amount, the solder alloy has a quite low solidus temperature which may be as low as around 135° C., the Sn-Bi eutectic temperature. However, by selecting the Zn and Ag contents as above, the alloy has a relatively high peak temperature above 170° C. and around 180° C. in most cases. Therefore, substantial solidification of the solder alloy takes place in a short period during soldering, thereby minimizing the possibility that the soldered joints are cracked upon application of vibration or impact thereto before they are substantially solidified.

The alloy composition of the solder alloy in the second embodiment was determined for the following reasons. Zn: 2%–10%

In an Sn-Zn alloy containing a relatively large amount of Bi, if the Zn content is less than 2% or more than 10%, the alloy will not have a liquidus temperature below 200° C. The Zn content is preferably from 4%–10% and more preferably 7%–10% in order to obtain the effects of addition of Ag and Bi sufficiently. Bi: 10%–30%

Addition of less than 10% Bi is not sufficient to decrease the liquidus temperature of the Sn-Zn-Ag alloy to 200° C. or lower. On the other hand, addition of more than 30% Bi significantly decreases the ductility and makes the alloy brittle. Preferably Bi is added in an amount of from 10%–25%, more preferably 15%–25%, and most preferably 18%–24%. Ag: 0.05%–2%

Ag is effective for improving the mechanical strength of an Sn-Zn alloy, and it is also effective for improving the corrosion resistance of the alloy. In Sn-Zn alloys containing 10%–30% Bi, these effects are not appreciable if Ag is added in an amount of less than 0.05%, and addition of more than 2% Ag abruptly increases the liquidus temperature of the alloy, resulting in an increase in the soldering temperature such that electronic devices may be thermally damaged. The Ag content is preferably from 0.05%–1%, preferably 0.05%–0.5%, and most preferably 0.1%–0.3%. P: 0.001%–1%

In order to prevent oxidation of zinc of the solder alloy in molten state, P may be added as described above for the first embodiment.

The following examples are presented to further illustrate the present invention. These examples are to be considered in all respects as illustrative and not restrictive.

EXAMPLES

Example 1

This example illustrates Sn-Zn solder alloys which additionally contain Ag and/or Cu with or without Bi, In, and/or P in accordance with the first embodiment.

Molten solder alloys having the compositions shown in Table 1 were cast into tensile test rods each having a central neck portion measuring 50 mm in length and 10 mm in diameter according to the JIS specifications. The tensile test rods were used to determine the tensile strength and elongation at break of each solder alloy, which are also shown in Table 1.

Table 1 further includes the melting temperatures, i.e., solidus temperature (S.T.) and liquidus temperature (L.T.) of each solder alloy determined by differential thermal analysis.

For comparison, conventional lead-free Sn-based solder alloys were tested in the same manner as described above, and the test results are also shown in Table 1.

A molten solder alloy of Alloy No. 1 shown in Table 1 was poured into a solder bath of an automatic dip soldering apparatus and used to solder electronic devices on printed circuit boards while the temperature of the molten solder alloy was maintained at 240° C. Visual inspection of the soldered electronic devices on the boards showed no signs of thermal damage or deterioration.

The other solder alloys in Table 1 according to the present invention can be used for soldering in the same manner. Since all the solder alloys according to the present invention shown in Table 1 have liquidus temperatures of 210° C. or lower, dip soldering can be performed at a temperature of molten solder alloy (soldering temperature) of 250° C. or below. Therefore, thermal damage to electronic devices can be eliminated or minimized. Also it is noted that the solidus temperatures of these alloys are as high as at least 180° C. giving narrow solidification temperature ranges, thereby ensuring that the molten solder alloy in soldered joints is rapidly solidified in a short period after soldering and cracking is minimized.

TABLE 1

| Alloy No. | Alloy Composition (wt %) | | | | | | | M.T. [1](° C.) | | Tensile Strength (kgf/mm$^2$) | % Elongation |
|---|---|---|---|---|---|---|---|---|---|---|---|
| | Sn | Zn | Ag | Cu | Bi | In | P | Others | S.T. | L.T. | | |
| 1 | Bal. | 9 | 0.2 | — | — | — | — | — | 199 | 200 | 5.76 | 62.8 |
| 2 | Bal. | 9 | 0.3 | 0.3 | — | 3 | — | — | 191 | 209 | 6.10 | 36.1 |
| 3 | Bal. | 9 | 0.2 | — | 5 | — | 0.01 | — | 191 | 200 | 8.32 | 18.4 |
| 4 | Bal. | 7 | 0.2 | — | 6 | — | — | — | 180 | 210 | 10.07 | 14.6 |
| 5 | Bal. | 8 | 0.3 | — | — | 2 | — | — | 196 | 201 | 5.75 | 33.3 |
| 6 | Bal. | 8 | 0.3 | — | 3 | 2 | — | — | 181 | 198 | 8.85 | 25.3 |
| 7 | Bal. | 9 | 0.2 | 0.2 | 4 | — | — | — | 191 | 203 | 8.10 | 20.6 |
| 8 | Bal. | 8 | — | 0.3 | — | 3 | — | — | 191 | 205 | 7.90 | 35.2 |
| 9 | Bal. | 9 | — | 0.5 | — | — | — | — | 198 | 207 | 6.18 | 47.5 |
| 10 | Bal. | 8 | 0.2 | 0.2 | 3 | 3 | — | — | 181 | 198 | 8.59 | 31.0 |
| 11 | Bal. | 7 | 0.2 | 0.5 | — | — | — | — | 198 | 207 | 6.22 | 46.3 |
| 12* | Bal. | 9 | — | — | — | — | — | — | 199[2] | | 4.82 | 62.8 |
| 13* | Bal. | — | 3.5 | — | — | — | — | — | 221[2] | | 4.60 | 52.0 |

TABLE 1-continued

| Alloy | Alloy Composition (wt %) | | | | | | | M.T. [1](° C.) | | Tensile Strength | % Elon- |
|---|---|---|---|---|---|---|---|---|---|---|---|
| No. | Sn | Zn | Ag | Cu | Bi | In | P | Others | S.T. | L.T. | (kgf/mm²) | gation |
| 14* | Bal. | — | — | — | — | — | — | Sb: 5 | 235 | 240 | 4.20 | 49.5 |
| 15*a | Bal. | — | — | — | 10 | 10 | — | — | 153 | 240 | 5.50 | 10.1 |
| 16*b | Bal. | — | 5 | 0.2 | 20 | — | — | Ga: 0.5 | 133 | 197 | 8.00 | 1.7 |
| 17*c | Bal. | 5 | 2 | — | 14 | — | — | Sb: 2 | 182 | 183 | 6.70 | 1.1 |

(Notes)*: Conventional lead-free Sn-based solder alloys
*a: Solder alloy described in JP Al 7-1178(1995)
*b: Solder alloy described in JP Al 7-40079(1995)
*c: Solder alloy described in JP Al 7-51883(1995)
1: M.T. = Melting Temp.; S.T. = Solidus Temp.; L.T. = Liquidus Temp.
2: Eutectic Alloy When Alloy No. 3 which additionally contains P is used in a molten state for dip soldering, oxidation of zinc in the solder bath can be prevented as stated above, thereby minimizing the number of times of removing oxidized products from the bath.

All the solder alloys in Table 1 according to the present invention had a tensile strength of at least 5 kgf/mm² and at least 10% elongation (at least 20% elongation except for Alloy No. 4). Thus, these solder alloys can form soldered joints with sufficient bonding strength and can be satisfactorily subjected to plastic working into wire, and the soldered joints will not be dislodged upon application of impact.

In contrast, conventional lead-free solder alloys have a liquidus temperature above 210° C., and/or a tensile strength of less than 5 kgf/mm² or less than 10% elongation.

to solder electronic devices on printed circuit boards while the temperature of the solder alloy was maintained at 240° C. Visual inspection of the soldered electronic devices on the boards showed no signs of thermal damage or deterioration.

As can be seen from Table 2, since all the solder alloys shown in this table have liquidus temperatures at 210° C. or lower, dip soldering can be performed at a temperature of molten solder alloy (soldering temperature) of 250° C. or below. Therefore, thermal damage to electronic devices can be eliminated or minimized. Also it is noted that the solidus temperatures of these alloys are as high as at least 180° C. giving narrow solidification temperature ranges, thereby ensuring that the molten solder alloy in soldered joints is rapidly solidified in a short period after soldering and cracking is minimized.

TABLE 2

| Alloy | Alloy Composition (wt %) | | | | | | | | M.T. [1] (° C.) | | Tensile Strength | % Elon- |
|---|---|---|---|---|---|---|---|---|---|---|---|---|
| No. | Sn | Zn | Ni | Ag | Cu | Bi | In | P | S.T. | L.T. | (kgf/mm²) | gation |
| 1 | Bal. | 9 | 0.1 | — | — | — | — | — | 199 | 200 | 6.24 | 68.8 |
| 2 | Bal. | 8 | 0.2 | — | 0.3 | — | 3 | — | 191 | 205 | 8.51 | 40.1 |
| 3 | Bal. | 8 | 0.1 | — | — | — | — | 0.01 | 199 | 200 | 5.80 | 61.5 |
| 4 | Bal. | 7 | 0.1 | — | — | 6 | — | — | 180 | 210 | 11.76 | 20.6 |
| 5 | Bal. | 8 | 0.1 | — | — | — | 2 | — | 196 | 201 | 6.85 | 39.3 |
| 6 | Bal. | 8 | 0.1 | — | — | 3 | 2 | — | 181 | 198 | 9.45 | 31.3 |
| 7 | Bal. | 9 | 0.2 | 0.2 | 0.2 | 4 | — | — | 191 | 203 | 8.43 | 25.4 |
| 8 | Bal. | 9 | 0.1 | — | 0.5 | — | — | — | 198 | 207 | 6.86 | 52.3 |
| 9 | Bal. | 9 | 0.1 | 0.3 | 0.3 | — | 3 | — | 191 | 209 | 6.42 | 42.7 |
| 10 | Bal. | 8 | 0.1 | 0.2 | 0.2 | 3 | 3 | — | 181 | 198 | 9.10 | 39.3 |
| 11 | Bal. | 9 | 0.2 | 0.2 | — | 5 | — | 0.01 | 191 | 200 | 8.85 | 23.3 |
| 12 | Bal. | 7 | 0.2 | 0.2 | 0.5 | — | — | — | 198 | 207 | 6.53 | 49.5 |
| 13 | Bal. | 9 | 0.1 | — | — | — | 3 | 0.01 | 196 | 198 | 7.90 | 36.1 |

(Notes) 1: M.T. = Melting Temp.; S.T. = Solidus Temp.; L.T. = Liquidus Temp.

Example 2

This example illustrates Sn-Zn solder alloys which additionally contain Ni with or without Ag, Cu, Bi, In, and/or P in accordance with the first embodiment.

The alloy compositions of the solder alloys which were prepared are shown in Table 2 along with the values for tensile strength, elongation, and melting temperatures (solidus and liquidus temperatures) determined in the same manner as described in Example 1.

Molten Alloy No. 1 shown in Table 2 was poured into a solder bath of an automatic dip soldering apparatus and used Alloys Nos. 3, 11, and 13 additionally contain P, and when these alloys are used in a molten state for dip soldering, oxidation of zinc in the solder bath can be prevented, thereby minimizing the number of times of removing oxidized products from the bath.

All the solder alloys shown in Table 2 have a tensile strength of at least 5 kgf /mm² and at least 20% elongation. Thus, these solder alloys can form soldered joints with sufficient bonding strength and can be satisfactorily subjected to plastic working into wire, and the soldered joints will not be detached when subjected to impact.

Example 3

This example illustrates Sn-Zn solder alloys which additionally contain Ag with a relatively large amount of Bi and optionally P in accordance with the second embodiment.

The alloy compositions of the solder alloys prepared are shown in Table 3 along with the values for tensile strength, elongation, and melting temperatures (solidus, peak, and liquidus temperatures) thereof determined in the same manner as described in Example 1.

TABLE 3

| Alloy No. | Alloy Composition (wt %) | | | | | | M.T.[1] (° C.) | | | Tensile Strength (kgf/mm$^2$) | % Elongation |
|---|---|---|---|---|---|---|---|---|---|---|---|
| | Sn | Zn | Bi | Ag | In | P | S.T. | P.T. | L.T. | | |
| 1 | Bal. | 8 | 11 | 0.1 | — | — | 164 | 189 | 195 | 11.6 | 12 |
| 2 | Bal. | 9 | 16 | 0.2 | — | — | 135 | 185 | 193 | 11.4 | 10 |
| 3 | Bal. | 10 | 20 | 0.2 | — | 0.01 | 136 | 180 | 187 | 11.7 | 10 |
| 4 | Bal. | 8 | 13 | 0.1 | — | — | 157 | 187 | 193 | 11.1 | 14 |
| 5 | Bal. | 8 | 22 | 0.3 | — | — | 135 | 178 | 183 | 11.7 | 11 |
| 6 | Bal. | 5 | 24 | 0.1 | — | 0.01 | 137 | 176 | 181 | 12.0 | 11 |
| 7 | Bal. | 7 | 18 | 0.3 | — | 0.01 | 134 | 183 | 189 | 11.7 | 10 |
| 8 | Bal. | 6 | 22 | 0.1 | — | — | 134 | 177 | 182 | 11.3 | 13 |

(Notes) 1: M.T. = Melting Temp.; S.T. = Solidus Temp.; P.T. = Peak Temp.; L.T. = Liquidus Temp.

Molten Alloy No. 1 shown in Table 3 was poured into a solder bath of an automatic dip soldering apparatus and used to solder electronic devices on printed circuit boards while the temperature of the solder alloy was maintained at 250° C. Visual inspection of the soldered electronic devices on the boards showed no signs of thermal damage or deterioration.

As can be seen from Table 3, since all the solder alloys shown in this table have liquidus temperatures below 200° C., dip soldering can be performed at a temperature of molten solder alloy (soldering temperature) of 250° C. or below. Therefore, thermal damage to electronic devices can be eliminated or minimized. The solidus temperature of these solder alloys are relatively low (in the range of 134° C. –164° C.), but their peak temperatures at which the solder alloys are substantially solidified are in the range of 176° C. –189° C. and are much higher than their respective solidus temperatures. Therefore, despite the low solidus temperatures, they are substantially solidified in a short period during soldering, and cracking of soldered joints which may occur upon application of vibration or impact during cooling can be minimized.

Alloys Nos. 3, 6, and 7 additionally contain P, and when these alloys are used in a molten state for dip soldering, oxidation of zinc in the solder bath can be prevented, thereby minimizing the frequency of removal of oxidized products from the bath.

All the solder alloys shown in Table 3 have a tensile strength of at least 10 kgf/mm$^2$ and at least 10% elongation. Thus, these solder alloys can form soldered joints with sufficient bonding strength and can be subjected to plastic working into wire, and the soldered joints will not be detached upon application of impact.

Industrial Applicability

Although the solder alloys according to the present invention are lead-free, Sn-based alloys, they have either a liquidus temperature below 210° C. and a solidus temperature above 180° C. as illustrated in Examples 1 and 2 or a liquidus temperature below 200° C. and a peak temperature above 170° C. as illustrated in Example 3, thereby giving a relatively narrow solidification temperature range between the liquidus temperature and either the solidus or peak temperature. Therefore, thermal damage to electronic devices can be eliminated or minimized, and cracking of soldered joints formed from these solder alloys can also be minimized.

Furthermore, these solder alloys have a tensile strength of at least 5 kgf/mm$^2$ and at least 10% elongation, which are sufficient to provide good bonding strength, prevent detachment of soldered joints upon application of impact, and enable the alloys to be plastically worked into wire.

Thus, the lead-free solder alloys according to the present invention are satisfactorily used in place of Sn-Pb alloys which are conventional solder alloys currently used to solder electronic devices, thereby preventing contamination of groundwater.

It will be appreciated by those skilled in the art that numerous variations and modifications may be made to the invention as described above with respect to specific embodiments without departing from the spirit or scope of the invention as broadly described.

What is claimed is:

1. A lead-free solder alloy consisting essentially of:
   from 2 to 10 wt % of Zn,
   from 15 to 25 wt % of Bi,
   from 0.05 to 2 wt % of Ag, and
   a balance of Sn,
   and having a liquidus temperature of 200° C. or lower and peak temperature of 170° C. or higher.

2. A lead-free solder alloy consisting essentially of:
   from 7 to 10 wt % of Zn,
   from 0.01 to 1 wt % of Ni,
   at least one of from 0.1 to 3.5 wt % of Ag and from 0.1 to 3 wt % of Cu, and a balance of Sn.

3. A lead-free solder alloy consisting essentially of:
   from 7 to 10 wt % of Zn,
   from 0.01 to 1 wt % of Ni,
   at least one of from 0.1 to 3.5 wt % of Ag and from 0.1 to 3 wt % of Cu,
   at least one of from 0.2 to 6 wt % of Bi and from 0.5 to 3 wt % of In, and
   a balance of Sn.

4. A lead-free solder alloy having a liquidus temperature below 210° C. consisting essentially of:
   from 7 to 10 wt % of Zn,
   from 0.1 to 3 wt % of Cu, and a balance of Sn, wherein Ag is not present, or is present in an amount of less than 0.1 wt %.

5. A lead-free solder alloy having a liquidus temperature below 210° C. consisting essentially of:

from 7 to 10 wt % of Zn, from 0.1 to 3 wt % of Cu, at least one of from 0.2 to 6 wt % of Bi and from 0.5 to 3 wt % of In, and a balance of Sn, wherein Ag is not present, or is present in an amount of less than 0.1 wt %.

6. A lead-free solder alloy having a liquidus temperature below 210° C. consisting essentially of:

from 7 to 10 wt % of Zn, at least one of from 0.1 to 3.5 wt % of Ag and from 0.1 to 3 wt % of Cu, from 0.001 to 1 wt % of P, and a balance of Sn.

7. A lead-free solder alloy having a liquidus temperature below 210° C. consisting essentially of:

from 7 to 10 wt % of Zn, at least one of from 0.1 to 3.5 wt % of Ag and from 0.1 to 3 wt % of Cu, at least one of from 0.2 to 6 wt % of Bi and from 0.5 to 3 wt % of In, from 0.001 to 1 wt % of P, and a balance of Sn.

* * * * *